(12) United States Patent
Schutt

(10) Patent No.: US 6,447,046 B1
(45) Date of Patent: Sep. 10, 2002

(54) TOP ELEMENT FOR A CONVERTIBLE TOP AND A CONVERTIBLE TOP

(75) Inventor: Thomas Schutt, Fürstenfeldbruck (DE)

(73) Assignee: Webasto Dachsysteme GmbH, Stockdorf (DE)

( * ) Notice: Subject to any disclaimer, the term of this patent is extended or adjusted under 35 U.S.C. 154(b) by 0 days.

(21) Appl. No.: 09/649,809

(22) Filed: Aug. 28, 2000

(30) Foreign Application Priority Data

Aug. 27, 1999 (DE) ......................................... 199 40 935

(51) Int. Cl.⁷ .................................................. B60J 7/12
(52) U.S. Cl. ...................................................... 296/118
(58) Field of Search ............................. 296/118, 120.1, 296/219, 104, 100.17, 100.18, 901, 121, 122; 52/735.1, 731.6, 309.1, 309.13

(56) References Cited

U.S. PATENT DOCUMENTS

| | | | | |
|---|---|---|---|---|
| 261,287 A | * | 7/1882 | Wittich et al. ............... 296/118 |
| 2,577,671 A | * | 12/1951 | Barrett ..................... 296/118 X |
| 4,840,420 A | * | 6/1989 | Weber ......................... 296/116 |
| 5,154,462 A | * | 10/1992 | Carpenter ..................... 293/120 |
| 5,511,844 A | * | 4/1996 | Boardman .................. 296/107 |
| 5,884,964 A | | 3/1999 | Roeper et al. |
| 5,904,114 A | * | 5/1999 | Wright ........................ 114/361 |
| 6,135,535 A | * | 10/2000 | Tarahomi .................... 296/102 |

FOREIGN PATENT DOCUMENTS

| | | |
|---|---|---|
| DE | 34 24 839 A1 | 1/1986 |
| DE | 40 01 136 A1 | 7/1991 |
| DE | 197 07 019 A1 | 10/1997 |

* cited by examiner

Primary Examiner—Stephen T. Gordon
Assistant Examiner—Patricia Engle
(74) Attorney, Agent, or Firm—Nixon Peabody LLP; David S. Safran

(57) ABSTRACT

A top element of a convertible roof which is formed from a plastic component 2 and a sheet metal part 3 as a composite part and in which major areas of the plastic component 2 and the sheet metal part 3 are spaced apart from one another and form a stiff cavity structure.

30 Claims, 5 Drawing Sheets

TOP ELEMENT FOR A CONVERTIBLE TOP AND A CONVERTIBLE TOP

BACKGROUND OF THE INVENTION

1. Field of the Invention

The invention relates to a top element for a convertible top and to a convertible top.

2. Description of Related Art

In current tops of convertibles, especially in folding tops, individual parts of the top linkage, such as the roof rod, control rod, cross bow, front bow, roof tip, main column, main rod or clamp clips are made of metal by punching, deep drawing, diecasting, stretching-bending or forging processes. However, these metal parts have high weight and can form a injury hazard due to splinters in case of a fracture of the part, splintering occurring especially in aluminum and magnesium diecast parts. The metal parts, furthermore, require corrosion protection and cannot be decorated so that separate optical covers are needed. This results in high production costs for a convertible top prepared using these components. In addition, top linkage parts formed especially as single-shell castings have only low bending and torsional stiffness.

SUMMARY OF THE INVENTION

An object of the invention is, therefore, to devise a top element for a convertible top which has high strength with low weight and can be produced at comparatively low cost. Another object of the invention is to devise a convertible top which has at least one such top element.

The initially mentioned object is achieved with a top element that is formed from a plastic component and from a sheet metal part as a composite component. One such composite structure enables combination of the advantages of sheet metal with those of plastic and leads to saving of weight with at least the same or even increased bending and torsional stiffness. Moreover, plastic offers the advantage that corrosion protection is not necessary and that the desired colors and surface structures can be considered directly in production.

Increased component strength of the top element is achieved especially in that major areas of the plastic component and the sheet metal part are spaced apart from one another and form a stiff cavity structure. The major areas are established depending on the shape of the component with consideration of the strength requirements and depending on the type of top element can be located at different points of the top element. Preferably, these major spaced areas form most of the plastic component or the entire top element.

When the plastic component and the sheet metal part form a thin-walled composite part with at least one large-volume cavity, an especially light composite part can be formed which still meets high strength requirements. Here, the size of the entire component and especially its extension on the greatest cross section of the cavity are limited solely by the available space for the closed and open convertible top.

Feasibly, the sheet metal part is joined to the plastic component by cementing, clinching or casting, and also any other joining techniques can be used.

The sheet metal part can have been put into the required form, for example, by deep drawing. The sheet metal can be especially thin and, thus, also light since it performs its support function only in an arrangement on the composite part. The plastic component can be produced as an injection molding, deep drawn part or laminated part, thus ensuring great freedom in shaping and also the bearing surfaces necessary for attaching the sheet metal can be optimally shaped.

For the structure of the composite part different arrangements of the sheet metal part and the plastic component can be chosen. Thus, the sheet metal part can form the bottom or inside and the plastic component can form the top or outside of the composite part of the convertible top in its arrangement with the convertible top closed. On the other hand, the plastic component can also form the bottom or inside and the sheet metal part can form the top or outside of the composite part. The arrangement is chosen essentially with consideration of the attachment of decoration and the fracture behavior of the materials being used at the time, such as especially plastic. A high-strength, but splintering plastic is placed on the outside of the top and is covered by sheet metal to the inside towards the passengers.

Preferably, the top element is the front bow of the convertible top, the plastic component being the bottom of the front bow and the sheet metal part being the top of the front bow.

To increase the strength it is feasible if the plastic component of the front bow has an essentially U-shaped cross channel. Additional components such as locks or drives can be accommodated and integrated into this cross channel.

Furthermore, it is feasible if the plastic component has reinforcements and especially stiffening ribs. When the stiffening ribs extend to the roof contour they can be used as bearing and support for the sheet metal part.

Other components can be integrated into the composite part, for example screens, pivots for rods, receivers for locks, catch hooks and the like. Receivers for rocker bearings of rods or guides can be made in the plastic component.

Furthermore, additional sheet metal parts, which can be joined directly to the sheet metal part, can be inserted or integrated in the plastic component.

For the plastic component different plastics such as polyamide (PA6.6) can be used, the plastic component being formed especially from a plastic with an essentially splinter-free fracture behavior if it is pointed towards the vehicle interior.

Feasibly, a top linkage part, such as especially a roof rod, a control rod, a main column, a cross bow, a front bow or a roof tip or a part combined from at least two of these linkage parts can be feasibly used as the top element, here the advantages of the composite construction with a plastic component having an especially positive benefit as a result of the freedom of configuration.

The second object is achieved in that the convertible top has at least one top element which is made as a composite part which is produced from a combination of a sheet metal part with a plastic component. Feasibly, the top element is made according to the aforementioned details and is especially a roof rod, a control rod, a main column, a cross bow, a front bow or a roof tip.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
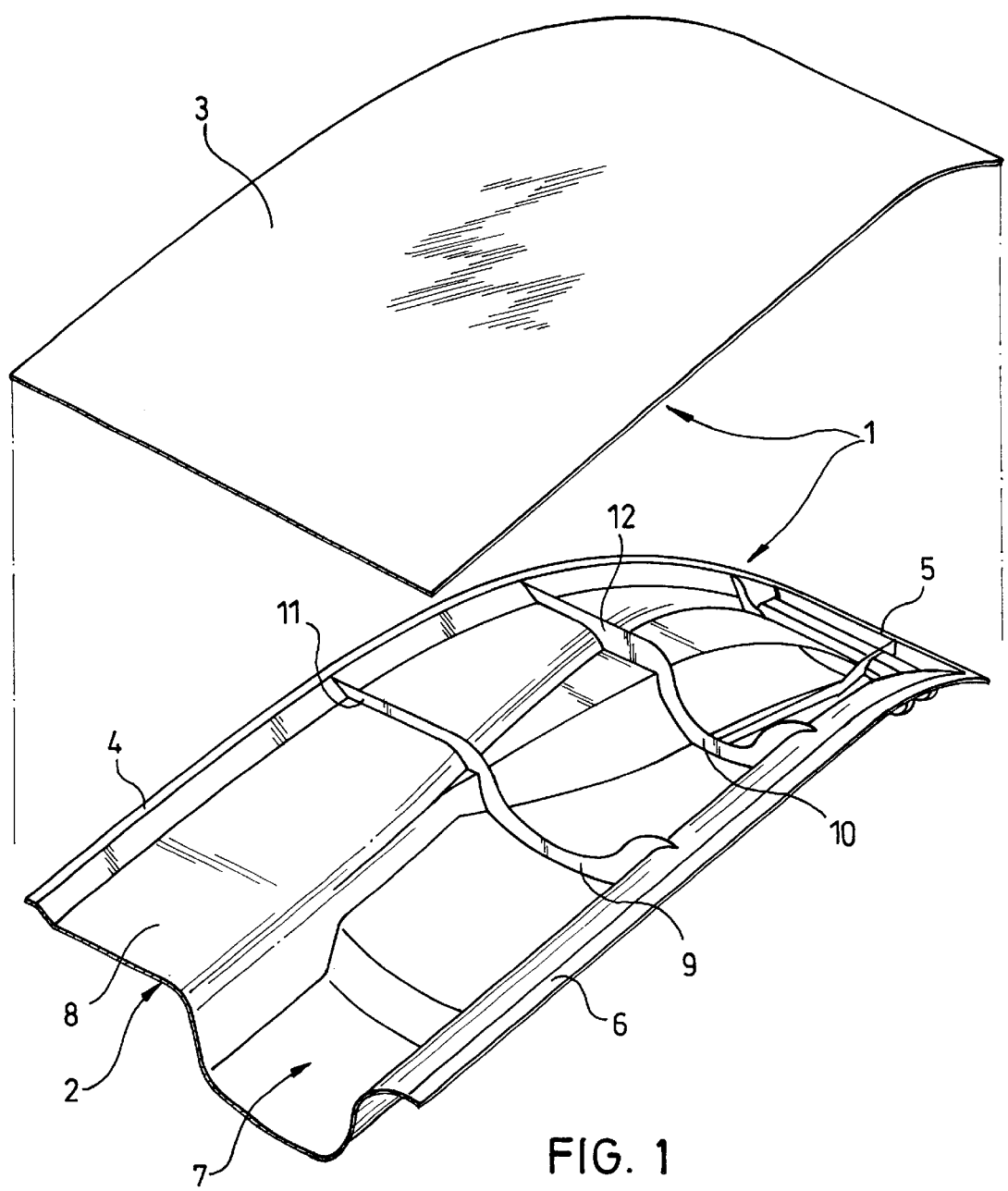
FIG. 1 is an exploded perspective top view of the right half of a front bow of a convertible cover with a bottom plastic component and a top sheet metal cover.
Figure 2:
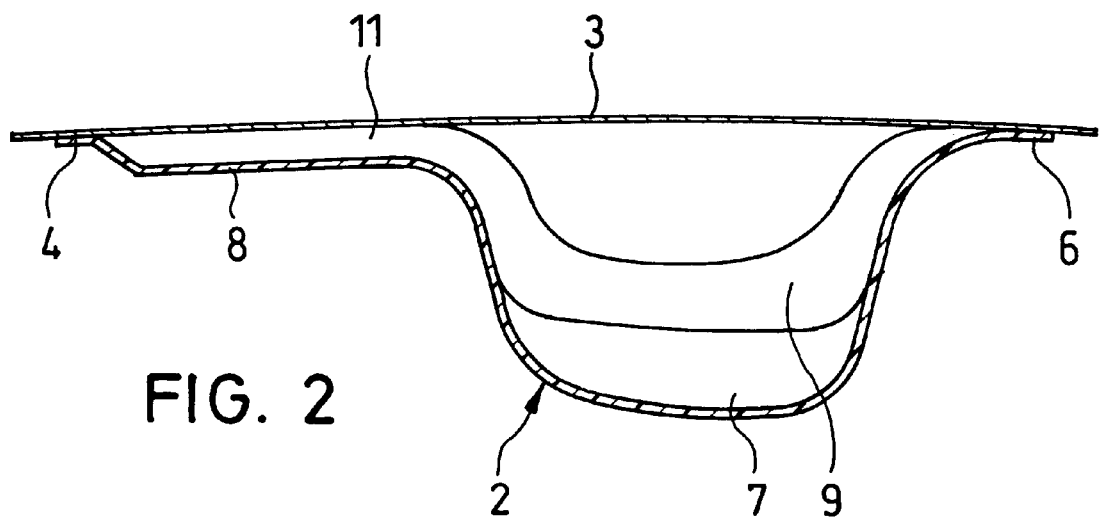
FIG. 2 is a lengthwise cross section view of the front bow.

The front bow 1 of a convertible top contains a plastic component 2 as the bottom and a shell-like sheet metal part 3 of steel or aluminum sheet attached thereto as the top (see FIGS. 1 and 2). The plastic component 2 has a front edge surface 4, a side edge surface 5 and a rear edge surface 6 which establish the shape of the roof contour and on which the sheet metal part 3, which is formed into an arched or crowned shape according to the roof contour rests, is attached, especially cemented. Thus, the front bow 1 is a composite part made of the plastic part 2 and the sheet metal part 3.

The plastic component 2 contains a crossbeam section 7 which is recessed in a roughly U-shape in the lengthwise cross section and which extends essentially over the entire width of the front bow 1 and imparts high bending and torsional stiffness to the composite part as a result of the voluminous rectangular hollow section. Here, in the middle area of the front bow 1 the crossbeam section 7 can have a thicker depression in order to offer sufficient stiffness to this area of high stress.

The front section of the plastic component 2 is a flat recess 8 which is offset from the front edge surface 4 and which also contributes to the component strength as a result of its distance to the sheet metal part 3. One or more lengthwise crosspieces 9 and 10 are made on the inside 11 of the plastic component 2 and extend from the front edge surface 4 to the rear edge surface 6. They stiffen the plastic component 2 and, additionally, offer, in the front section 11 and 12, a rest and support for the sheet metal part 3 which then either only rests on it or is also cemented. There can be additional stiffening ribs in the highly stressed component areas.

Figure 3:
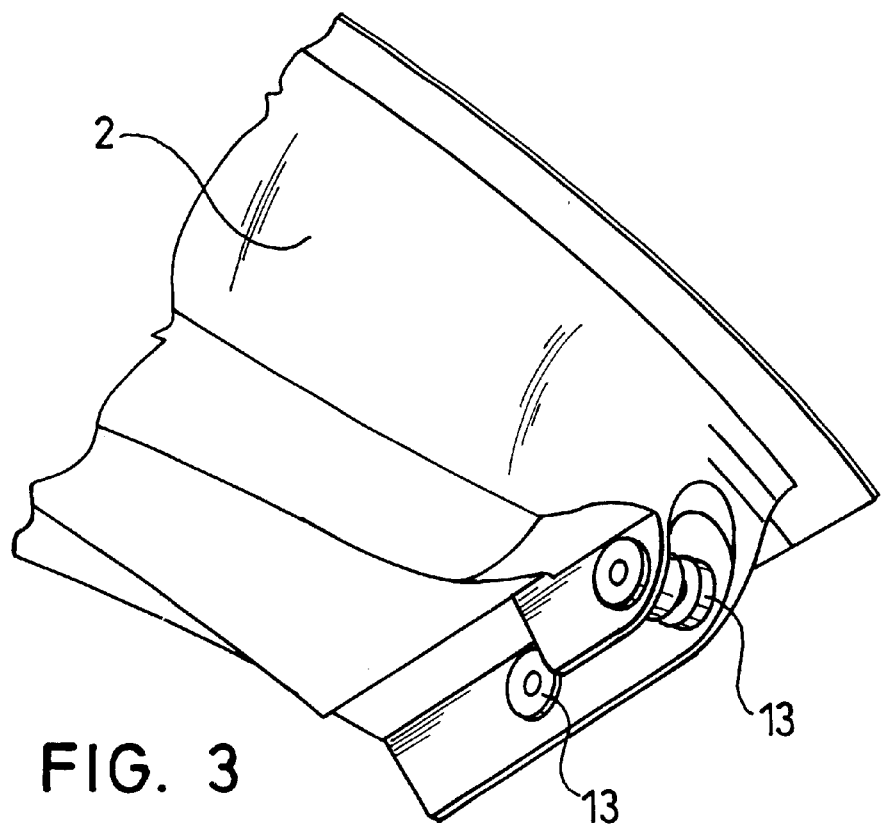
FIG. 3 is a perspective of the right edge area of the front bow from below.

The coupling points 13 provided for moving the front bow 1 when the convertible top is opened and closed (see FIG. 3) or the rod bearings for the auxiliary rods on the two opposite sides of the front bow 1 are incorporated as metal or sheet metal parts in the production of the plastic components 2 and are integrated as inserts which are molded into the plastic component 2 or inserted subsequently into the corresponding recesses.

Figure 4:
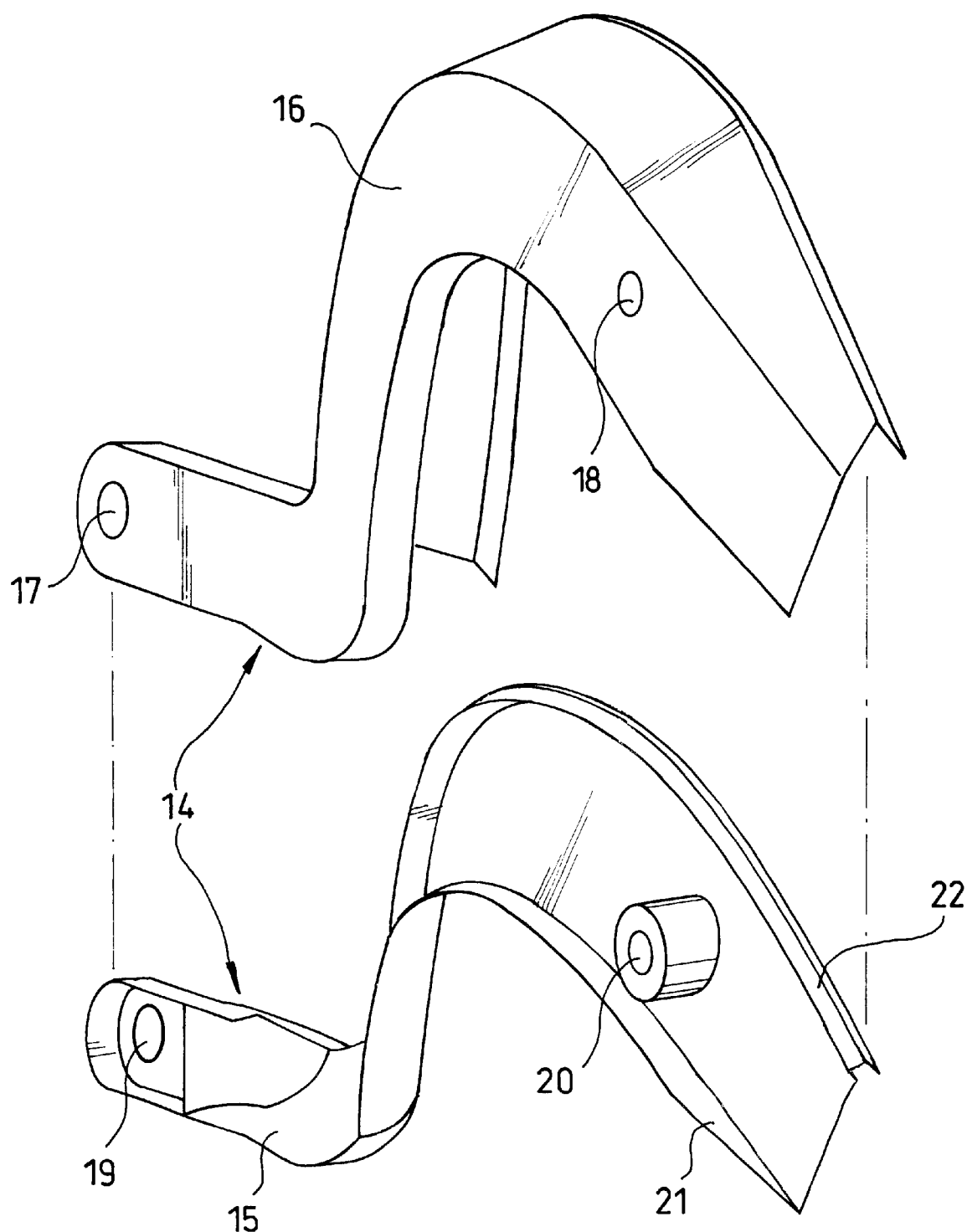
FIG. 4 is an exploded top perspective view of the main column of a convertible top.
Figure 6:
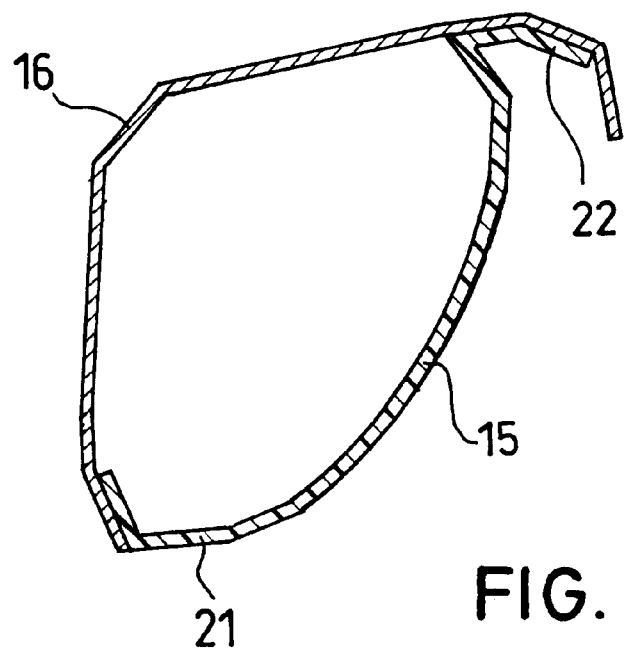
FIG. 6 is a cross sectional view of the main column of FIG. 4.

As another top element a main column 14 (see FIG. 4) of the convertible top is produced from a plastic part 15 and a machined sheet metal part 16 cemented to it, as a composite part. Bearing holes 17 and 18 in the machined sheet metal part 16 coincide with assigned openings 19 and 20 which are stiffened by moldings on the plastic part 15 and hold connecting hinges for side roof rods. The connection of the plastic part 15 to the machined sheet metal part 16 is done on the edge sections 21 and 22 of the plastic part 15 (see FIG. 6). High bending and torsional stiffness is also achieved by the voluminous cavity cross section of the main column 14 in this composite part.

Figure 5:
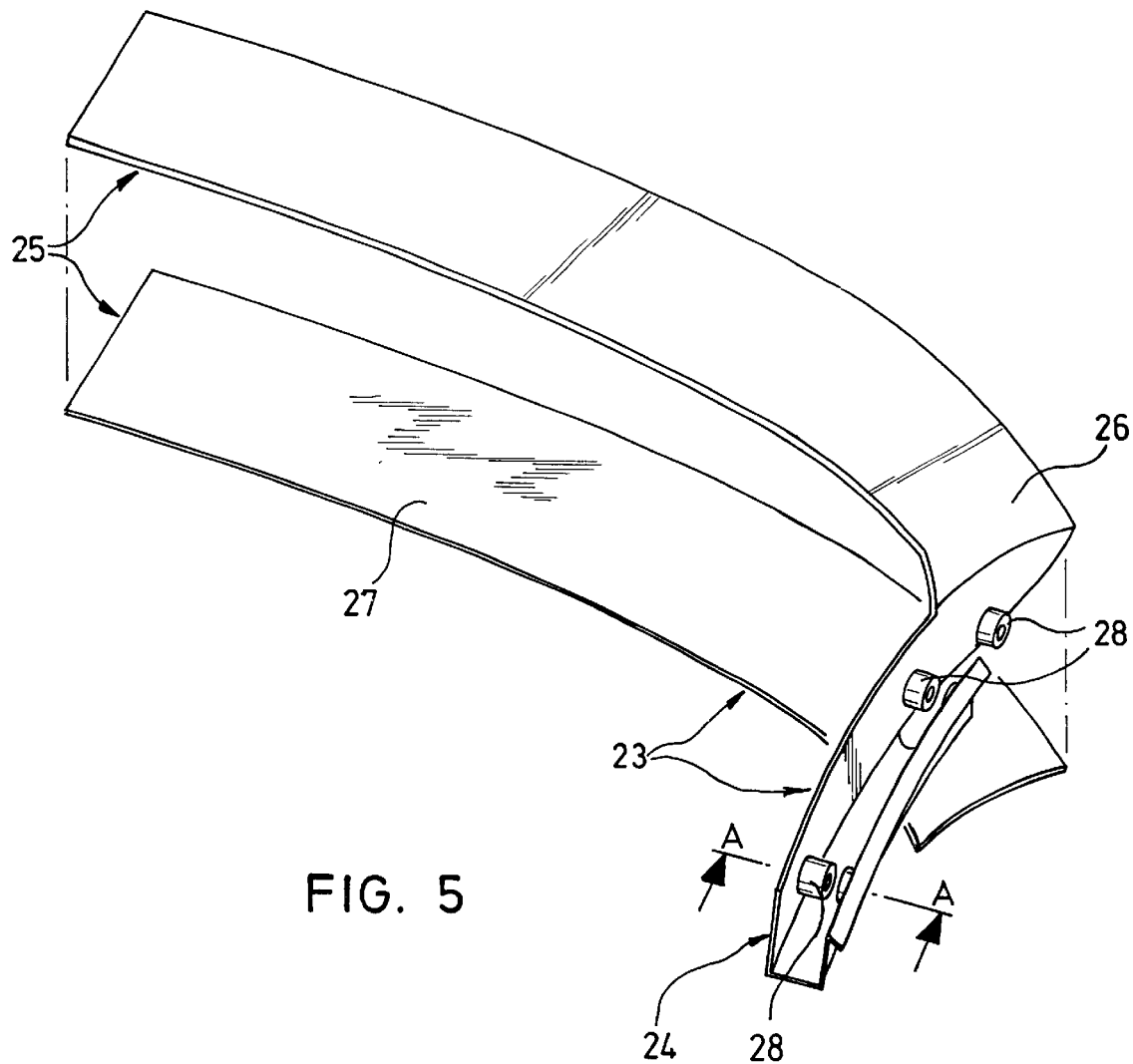
FIG. 5 is an exploded perspective top view of a center bow with a side roof rod of the convertible top molded to it.
Figure 7:
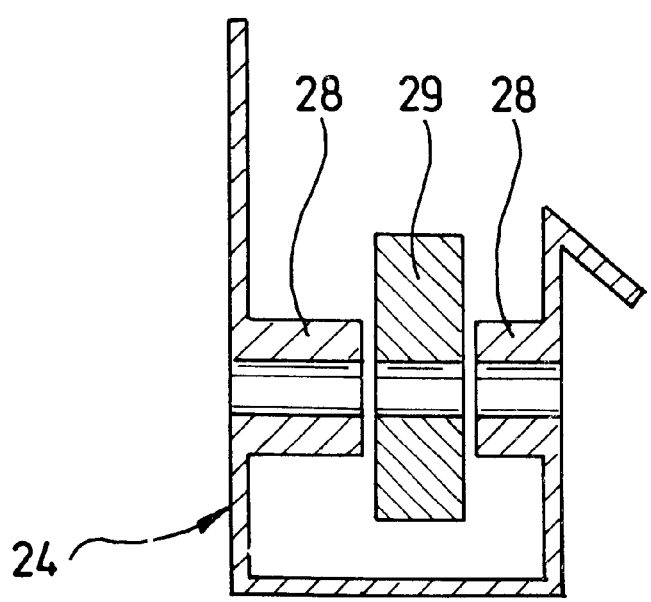
FIG. 7 is a cross sectional view of the roof rod taken along line A—A of FIG. 5.

Another example of a top element formed as a composite part is shown in FIG. 5 in a half view and shows a roof assembly 23 which contains a side roof rod 24 and a bow 25 which joins the roof rods 24. For example, a middle or main bow of the convertible top which is a plastic part 26 formed in one piece with the side roof rods 24 and a sheet metal part 27 which is cemented from underneath to the plastic part 26. The plastic part 26 is produced from high-strength plastic. In order to protect the passengers in case of a crash from sharp plastic fragments, in this composite part the sheet metal part 27 is attached to the bottom of the plastic part 15 facing the passenger compartment. In the roof rod 24 bearing receivers 28 for hinged connections to the rods 29 (see also FIG. 7) are made. The box-shaped profile of the roof rod 24 offers the necessary bending and torsional strength.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Top element for a convertible top, said top comprising:
    a plastic component having coupling points for attachment to a convertible top moving mechanism; and
    a sheet metal part having a substantially planer portion joined to said plastic component;
    wherein said substantially planer portion of sheet metal part is spaced from said plastic component such that said plastic component and said sheet metal part define a stiff cavity structure.

2. The top element of claim 1, wherein a major portion of said plastic component defines a portion of said cavity structure.

3. The top element of claim 1, wherein the plastic component and the sheet metal part form a thin-walled composite part with at least one cavity.

4. The top element of claim 1, wherein the sheet metal part is joined to the plastic component by one of cementing, clinching and casting.

5. The top element of claim 1, wherein the sheet metal part is a deep drawn part.

6. The top element of claim 1, wherein the plastic component is produced by one of injection molding, deep drawing and laminating.

7. The top element of claim 1, wherein the sheet metal part forms the bottom inside and the plastic component forms the top, outside of the top element of the convertible top when the top is closed.

8. The top element of claim 1, wherein the plastic component forms the bottom, inside and the sheet metal part forms the top, outside of the top element of the convertible top when the convertible top is closed.

9. The top element of claim 1, wherein the top element forms a front bow of the convertible top and wherein the plastic component forms the bottom of the front bow and the sheet metal part forms the top of the front bow.

10. The top element of claim 9, wherein the plastic component of the front bow has an essentially U-shaped cross channel.

11. The top element of claim 1, wherein the plastic component has reinforcements and stiffening ribs.

12. The top element of claim 1, wherein the coupling points of said plastic component include receivers for rocker bearings of rods or guides.

13. The top element of claim 1, wherein said plastic component includes an additional sheet metal part.

14. The top element of claim 1, wherein the plastic component is formed from a plastic with an essentially splinter-free fracture behavior.

15. The top element of claim 1, wherein said top element forms at least a portion of a top linkage part, said top linkage part being one of a roof rod, a control rod, a main column, a cross bow, a front bow and a roof tip.

16. A convertible top, said top comprising:
   at least one top element that includes a sheet metal part having a substantially planer portion and a plastic component having coupling points for attachment to a convertible top moving mechanism; wherein said substantially planer portion of said sheet metal part is spaced from said plastic component such that said plastic component and said sheet metal part define a stiff cavity structure.

17. The convertible top of claim 16 wherein a major portion of said plastic component defines a portion of said cavity structure.

18. The convertible top of claim 16, wherein the plastic component and the sheet metal part form a thin-walled composite part with at least one cavity.

19. The convertible top of claim 16, wherein the sheet metal part is joined to the plastic component by one of cementing, clinching and casting.

20. The convertible top of claim 16, wherein the sheet metal part is a deep drawn part.

21. The convertible top of claim 16, wherein the sheet plastic component is produced by one of injection molding, deep drawing and laminating.

22. The convertible top of claim 16, wherein the sheet metal part forms the bottom inside and the plastic component forms the top, outside of the top element of the convertible top when the top is closed.

23. The convertible top of claim 16, wherein the plastic component forms the bottom, inside and the sheet metal part forms the top, outside of the top element of the convertible top when the convertible top is closed.

24. The convertible top of claim 16, wherein the top element forms a front bow of the convertible top and wherein the plastic component forms the bottom of the front bow and the sheet metal part forms the top of the front bow.

25. The convertible top of claim 24, wherein the plastic component of the front bow has an essentially U-shaped cross channel.

26. The convertible top of claim 16, wherein the plastic component has reinforcements and stiffening ribs.

27. The convertible top of claim 16, wherein the coupling points of said plastic component include receivers for rocker bearings of rods or guides.

28. The convertible top of claim 16, wherein said plastic component includes an additional sheet metal part.

29. The convertible top of claim 16, wherein the plastic component is formed from a plastic with an essentially splinter-free fracture behavior.

30. The convertible top of claim 16, wherein said top element forms at least a portion of a top linkage part, said top linkage part being one of a roof rod, a control rod, a main column, a cross bow, a front bow and a roof tip.

* * * * *